No. 816,130. PATENTED MAR. 27, 1906.
C. A. SHAW.
FISH HOOK.
APPLICATION FILED JUNE 30, 1905.

WITNESSES~
INVENTOR
Charles A. Shaw
John L. Kindt
BY HIS ATTY.

UNITED STATES PATENT OFFICE.

CHARLES A. SHAW, OF CHICAGO, ILLINOIS.

FISH-HOOK.

No. 816,130.　　　　Specification of Letters Patent.　　　　Patented March 27, 1906.

Application filed June 30, 1905. Serial No. 267,692.

*To all whom it may concern:*

Be it known that I, CHARLES A. SHAW, a citizen of the United States, residing in Chicago, county of Cook, and State of Illinois, have invented certain new and useful Improvements in Fish-Hooks, of which the following is a specification.

This invention relates to fish-hooks; and the object is to provide a hook which is designed for the use of the angler who fishes for game fish principally among the weeds and rushes by the process known as "casting" with a rod and reel or other similar process which consists in throwing out a baited hook on the surface of the water and drawing same back to the angler.

A further object of my invention is to provide a hook with a float which is adapted to maintain the hook in a horizontal position when being reeled through the water. My float is made of some suitable material—such as soft pine, cork, or hollow air-tight metallic substance—just large enough to provide enough buoyancy to control the hook and keep it in a horizontal position with the point on the upper side. When in this position, the hook will slip over the rushes and lily-pads without danger of snagging while in the water and being reeled toward the angler.

A further advantage of the use of my invention is that by reason of the point of the hook being kept upward when in the water the fish does not have a view of the point when he comes from below to engage it.

Figure 1:
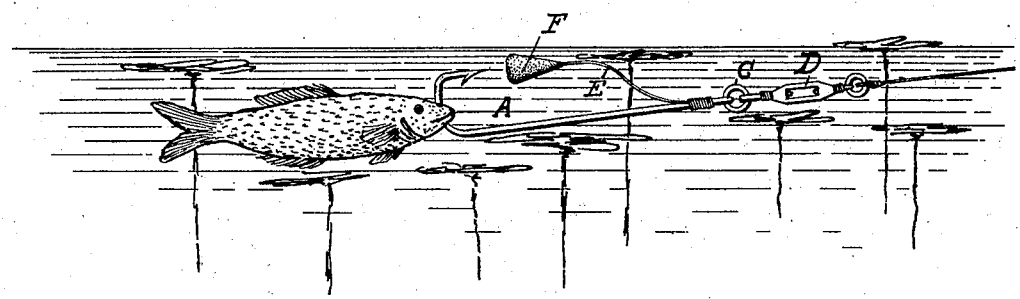
Figure 2:
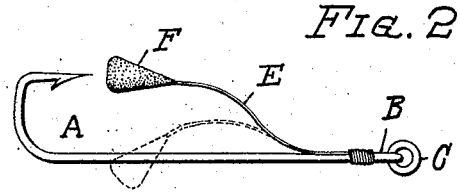
Figure 3:
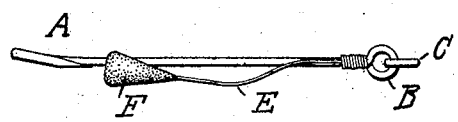
Figure 4:
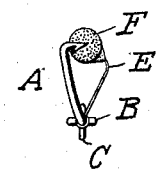

In the accompanying drawings, Figure 1 is a side elevation of my improved fish-hook, showing it in position when reeled in the water. Fig. 2 is an enlarged elevation thereof. Fig. 3 is a plan view of same, and Fig. 4 is an end elevation.

A designates the ordinary fish-hook, having an eye B at the end of its shank and a ring C attached to the eye B. This ring engages the swivel D.

E designates a flexible steel wire, one end of which is securely wound around the shank of the hook A. This wire is resilient and is curved, so that one end thereof under normal conditions is in alinement with the point of the hook A.

A float F, constructed of wood, cork, or other buoyant material, is secured to the free end of the wire E. This float is preferably cone-shaped and is adapted to be of such a diameter that it will keep the hook A in a horizontal position at all times and which will hold the point of the hook A upward.

Having thus described my invention, what I claim, and desire to secure by Letters Patent, is—

1. The combination with a fish-hook, of a flexible wire, one end of which is rigidly secured to the shank of the hook, the free end of said wire extending toward the point of said hook, a float rigidly secured to the free end of said wire and adapted to hold the hook in a horizontal position when reeled in the water, and to hold the point of the hook upward, substantially as described.

2. The combination with a fish-hook, of a flexible wire, one end of which is rigidly secured to the shank of the said hook, and the opposite end thereof extending toward the point of said hook, a float rigidly secured to the free end of said wire, said float adapted to have enough buoyancy to keep the hook in a horizontal position when reeled in the water, and to prevent the hook from sinking, substantially as and for the purpose specified.

3. The combination with a fish-hook, of a flexible wire, one end of which is rigidly secured to the shank of the hook, the free end of said wire extending toward the point of the hook, a float rigidly secured to the free end of said wire and adapted to protect the point of the hook from engaging obstructions, and to hold the point of the hook upward, substantially as and for the purpose specified.

In testimony that I claim the foregoing as my invention I have signed my name in the presence of two subscribing witnesses.

CHARLES A. SHAW.

Witnesses:
　CONRAD C. HELLING,
　HAROLD A. PATTERSON.